United States Patent
Blaha et al.

(10) Patent No.: US 7,843,670 B2
(45) Date of Patent: Nov. 30, 2010

(54) ISOLATED SWITCHED MAINTAIN POWER SIGNATURE (MPS) AND FAULT MONITORING FOR POWER OVER ETHERNET

(75) Inventors: Matthew Blaha, Holmdel, NJ (US); Luis de la Torre, Daganzo de Arriba (ES); Patrick J. Quirk, Huntsville, AL (US); Fadi Saibi, Hoboken, NJ (US)

(73) Assignee: Agere Systems Inc., Allentown, PA (US)

( * ) Notice: Subject to any disclaimer, the term of this patent is extended or adjusted under 35 U.S.C. 154(b) by 513 days.

(21) Appl. No.: 11/536,770

(22) Filed: Sep. 29, 2006

(65) Prior Publication Data
US 2008/0080105 A1 Apr. 3, 2008

(51) Int. Cl.
H02H 7/00 (2006.01)
(52) U.S. Cl. .................................. 361/18; 361/93.1
(58) Field of Classification Search ............ 361/18, 361/87, 93.1; 363/21.04–21.17, 20–21.03, 363/80
See application file for complete search history.

(56) References Cited

U.S. PATENT DOCUMENTS

| | | | | |
|---|---|---|---|---|
| 4,004,104 A | | 1/1977 | Picandet et al. ............... | 179/70 |
| 4,761,702 A | * | 8/1988 | Pinard ......................... | 361/18 |
| 5,138,543 A | * | 8/1992 | Harm et al. ................. | 363/21.08 |
| 5,305,192 A | * | 4/1994 | Bonte et al. ................. | 363/21.16 |
| 5,402,329 A | * | 3/1995 | Wittenbreder, Jr. ........... | 363/16 |
| 5,461,303 A | * | 10/1995 | Leman et al. ................ | 323/222 |
| 5,757,625 A | * | 5/1998 | Schoofs ....................... | 363/21.13 |
| 5,991,172 A | * | 11/1999 | Jovanovic et al. ............ | 363/21.14 |
| 6,343,026 B1 | * | 1/2002 | Perry .......................... | 363/65 |
| 6,640,308 B1 | | 10/2003 | Keyghobad et al. .......... | 713/300 |
| 6,650,070 B1 | * | 11/2003 | Hudson et al. ............... | 315/312 |

(Continued)

FOREIGN PATENT DOCUMENTS

DE  103 32 841 A1  2/2005
JP  2001203085 A * 7/2001

OTHER PUBLICATIONS

LT1737 Data Sheet, Linear Technology Corporation, Jun. 6, 2005, pp. 1-28.

(Continued)

*Primary Examiner*—Jared J Fureman
*Assistant Examiner*—Christopher J Clark
(74) *Attorney, Agent, or Firm*—Mendelsohn, Drucker & Associates, P.C.; Edward J. Meisarosh; Steve Mendelsohn (57) ABSTRACT

One embodiment monitors a line-side electrical current provided by a power sourcing equipment (PSE) port to a powered device (PD), the PSE port having a power-isolation transformer with a primary coil on an isolated side and a secondary coil on a line side. A switching signal having a switching period and a duty cycle is applied to the primary coil of the power-isolation transformer. A value is determined for an electrical current on the isolated side of the power-isolation transformer, conversion is performed between a line-side electrical current value $I_{out}$ and a corresponding isolated-side peak-current value $I_{peak}$, and the line-side electrical current is indirectly monitored based on the determined isolated-side current value.

30 Claims, 6 Drawing Sheets

U.S. PATENT DOCUMENTS

| | | | | |
|---|---|---|---|---|
| 6,958,920 | B2* | 10/2005 | Mednik et al. | 363/19 |
| 6,967,472 | B2 | 11/2005 | Balakrishnan et al. | |
| 6,972,969 | B1* | 12/2005 | Shteynberg et al. | 363/21.12 |
| 6,977,824 | B1* | 12/2005 | Yang et al. | 363/21.16 |
| 6,995,991 | B1 | 2/2006 | Yang et al. | |
| 7,054,170 | B2* | 5/2006 | Yang et al. | 363/21.18 |
| 7,057,907 | B2* | 6/2006 | Oh | 363/21.05 |
| 7,061,780 | B2 | 6/2006 | Yang et al. | 363/21.16 |
| 7,142,437 | B2* | 11/2006 | Park | 363/18 |
| 7,196,503 | B2* | 3/2007 | Wood et al. | 323/276 |
| 7,259,972 | B2* | 8/2007 | Yang | 363/21.16 |
| 7,280,376 | B2* | 10/2007 | McDonald et al. | 363/20 |
| 7,307,390 | B2* | 12/2007 | Huynh et al. | 315/291 |
| 7,362,593 | B2 | 4/2008 | Yang et al. | 363/21.16 |
| 7,471,522 | B2* | 12/2008 | Ng et al. | 363/21.12 |
| 7,471,531 | B2* | 12/2008 | Blaha et al. | 363/97 |
| 7,486,528 | B2* | 2/2009 | Yang | 363/21.12 |
| 2003/0080723 | A1* | 5/2003 | Chen et al. | 324/76.29 |
| 2005/0169017 | A1 | 8/2005 | Muegge et al. | |
| 2005/0285587 | A1* | 12/2005 | Yang et al. | 324/103 P |
| 2006/0002155 | A1* | 1/2006 | Shteynberg et al. | 363/21.12 |
| 2006/0034102 | A1 | 2/2006 | Yang et al. | 363/21.13 |
| 2006/0056204 | A1 | 3/2006 | Yang et al. | |
| 2006/0117089 | A1 | 6/2006 | Karam | |
| 2007/0019445 | A1 | 1/2007 | Blaha et al. | 363/21.12 |
| 2007/0024213 | A1* | 2/2007 | Shteynberg et al. | 315/291 |
| 2007/0070664 | A1* | 3/2007 | Chen | 363/95 |
| 2008/0049459 | A1* | 2/2008 | Blaha et al. | 363/21.16 |
| 2008/0071260 | A1* | 3/2008 | Shores | 606/34 |
| 2008/0192514 | A1* | 8/2008 | Zhou et al. | 363/21.12 |
| 2008/0238447 | A1 | 10/2008 | de la Torre Vega et al. | 324/676 |

OTHER PUBLICATIONS

L. Balogh, "A Practical Introduction to Digital Power Supply Control", Texas Instruments Incorporated, 2005, pp. 6-1 through 6-29. Downloaded from http://focus.ti.com/lit/ml/slup232.pdf, Apr. 5, 2006.

L. Dixon, "Control Loop Cookbook", Texas Instruments Incorporated, 2002, 41 pages. Downloaded from: http://focus.ti.com/lit/ml/slup113a/slup113a.pdf, Apr. 5, 2006.

K. Kittipeerachon, et al., "Feedback Compensation Design for Switched Mode Power Supplies with a Right-Half-Plane (RHP) Zero", Power Electronics, Machines and Drives, 2004, (PEMD 2004). Second International Conference on (Conf. Publ. No. 498), pp. 236-241.

Y-F. Liu, et al., "Digital Control of Switching Power Converters", Proc. of IEEE Conference on Control Applications, Toronto, Canada, Aug. 28-31, 2005, pp. 635-640.

A. Peterchev, et al., "Quantization Resolution and Limit Cycling in Digitally Controlled PWM Converters", IEEE Trans. on Power Electronics, vol. 18, No. 1, Jan. 2003, pp. 301-308.

"Introduction to Power Supplies", National Semiconductor Application Note 556, Sep. 2002, pp. 1-7. Downloaded from: http://www.efficientpowersupplies.org/pages/intro_to_power_supplies.pdf, Apr. 5, 2006.

* cited by examiner

ISOLATED SWITCHED MAINTAIN POWER SIGNATURE (MPS) AND FAULT MONITORING FOR POWER OVER ETHERNET

CROSS-REFERENCE TO RELATED APPLICATION

This application contains subject matter related to the U.S. patent application titled "Switch with Fully Isolated Power Sourcing Equipment Control," whose serial number is Ser. No. 11/369,057, filed on Mar. 6, 2006, which is incorporated herein by reference in its entirety.

BACKGROUND OF THE INVENTION

1. Field of the Invention

The current invention relates to communication networks capable of transmitting electrical power along with data, and more particularly, to systems and methods for the transmission of electrical power in Power-over-Ethernet (PoE) systems.

2. Description of the Related Art

A Power-over-Ethernet system is an Ethernet network capable of transmitting both data and electrical power over twisted wire pair cables, such as category 5 cables. Ethernet is currently defined by the IEEE 802.3 standard, and PoE is currently defined by the IEEE 802.3af standard, both of which are incorporated herein by reference. Using PoE allows for the convenient delivery of electrical power to Ethernet client devices, such as Internet telephones or cameras, which may otherwise require more cumbersome powering arrangements in order to operate. PoE allows for the delivery of electrical power using the same cables that transmit Ethernet data.

Figure 1:
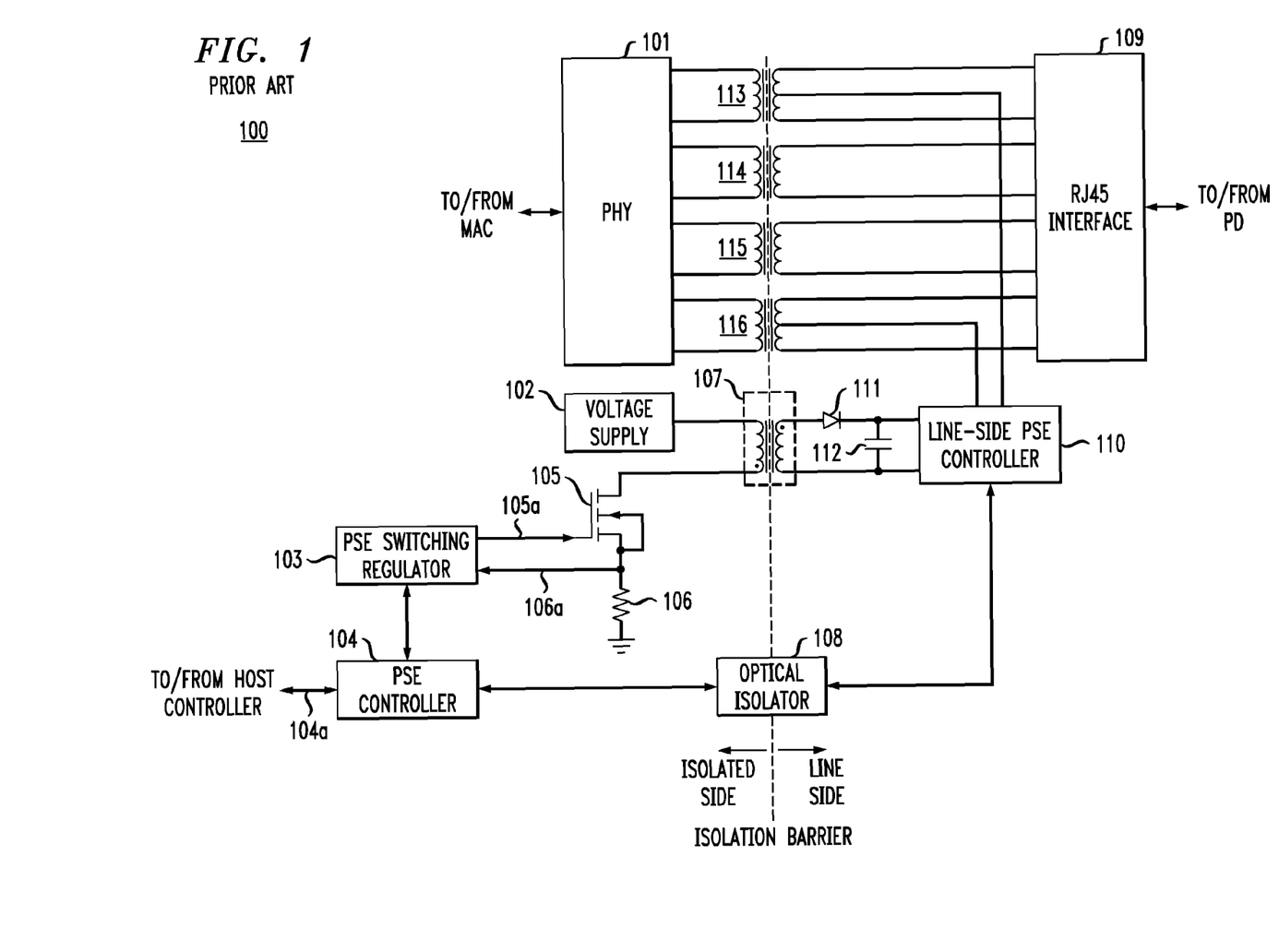
FIG. 1 shows a simplified block diagram of a conventional power sourcing equipment (PSE) port.

FIG. 1 shows a simplified block diagram of conventional power sourcing equipment (PSE) port 100, which is part of a PSE (not shown), which in turn is part of a PoE system that also comprises a powered device (PD) (not shown). The PD receives its electrical power from the PSE. A PSE can have multiple ports, wherein each port is adapted to connect to a PD. A PD can be, for example, a voice-over-IP (VoIP) telephone, a wireless hub, or a networked camera. PSE port 100 supports Ethernet communication services in accordance with the Ethernet standard, as well as the provision of electrical power in accordance with the PoE standard. Ethernet communication is supported by physical-layer module (PHY) 101, which connects to RJ45 interface 109 via signal-isolation transformers 113, 114, 115, and 116. RJ45 interface 109 in turn connects to the RJ45 interface (not shown) of the PD via a category 5 unshielded twisted pair cable path (not shown), which may include multiple cables and connectors. PHY 101 also connects to a media access controller (MAC) (not shown).

Transformers 113, 114, 115, and 116 support electrical isolation between the so-called isolated side of PSE port 100 and the so-called line side of PSE port 100. The isolated side is on the primary side of the transformers of PSE port 100, while the line side is on the secondary side of the transformers of PSE port 100. The two sides are isolated by an isolation barrier, represented in FIG. 1 as a dashed line, which helps protect sensitive devices on the isolated side from electrical surges on the line side. The isolation barrier is also supported by power transformer 107 and optical isolator 108. The isolated side of PSE port 100 comprises PHY 101, voltage supply 102, transistor 105, resistor 106, PSE switching regulator 103, and PSE controller 104. The line side of PSE port 100 comprises RJ45 interface 109, line-side PSE controller 110, diode 111, and capacitor 112. PSE port 100 further comprises devices supporting the isolation barrier, specifically, optical isolator 108 and transformers 113, 114, 115, 116, and 107, which are located on both sides of the isolation barrier. It should be noted that ports might share some components. For example, several ports might use the same voltage supply, PSE controller, or line-side PSE controller. Also, single physical components might support multiple ports, such as an octal PHY that can support eight ports. Thus, unless otherwise indicated or necessary, references herein and in the figures to particular elements refer to functional units and do not limit their physical implementation.

Voltage supply 102 provides electrical power for transmission to the PD, which expects to be able to draw a range of currents at a regulated voltage of 48V. Voltage supply 102 provides a DC voltage whose value is based on the supply voltages commonly available in the particular implementation of the PSE. An appropriate turns ratio is selected for transformer 107 so as to provide 48V to the PD. For example, voltage supply 102 can provide 48V with a turns ratio of 1:1 for transformer 107, or voltage supply 102 can provide 12V with a turns ratio of 1:4 for transformer 107. Other combinations of turns ratio and voltage are possible, as well. For example, voltage supply 102 can provide 12V and be paired with transformer 107 having a 1:5 turns ratio, allowing for voltage losses and/or regulation on the line side and/or in the PD. Electrical power from voltage supply 102 is (i) transformed by power transformer 107, (ii) conditioned by diode 111 and capacitor 112, and (iii) transmitted to the PD via line-side PSE controller 110 using two of the four pairs of wires in the cable path connecting the PD to PSE port 100. Although this specification describes Ethernet devices using four signal-isolation transformers and four wire pairs, the teachings of this specification apply equally well to devices using only two signal-isolation transformers and two wire pairs, or Ethernet devices using other isolation means.

The supply of electrical power from PSE port 100 to the PD is regulated by switching regulator 103 through use of transistor 105 and optional current-sense resistor 106. Switching regulator 103 uses path 105a to control transistor 105 by using pulse-width modulation (PWM). Typically, the frequency of the pulses generated by switching regulator 103 remains constant, but their width varies, thereby determining the duty cycle of the switching signal generated by switching regulator 103. The duty cycle is the ratio, for a cycle, of the interval that the pulse is high to the length of the cycle. Thus, a pulse cycle wherein the pulse is high for ⅗ths of the cycle has a 60% or 0.6 duty cycle. Generally, increasing the duty cycle increases the average output voltage provided to the PD.

If transistor 105 is on, i.e., during the high part of the duty cycle of the switching signal on path 105a, then current flows through the primary coil of transformer 107. If transistor 105 is on, then due to diode 111, substantially no current flows through the secondary coil of transformer 107. When transistor 105 is turned off, i.e., during the low part of the duty cycle of the switching signal on path 105a, current substantially stops flowing through the primary coil of transformer 107. Current then starts to flow through the secondary coil of transformer 107 as the electromagnetic energy built up in the primary coil of transformer 107 is transferred to its secondary coil. The current through the secondary coil starts at a level proportional to the current that was flowing through the primary coil, possibly exhibiting an initial spike, and either steadily declines all the way to zero, or drops to zero with the turn-on of transistor 105, which starts the cycle anew.

Switching regulator 103 can operate in either discontinuous or continuous mode, depending on the required current draw and the duty cycle. For a given regulated output voltage level, that is to say a given steady state duty cycle, at lower output current draws (light load), transformer 107 operates in discontinuous mode, in which the current through its secondary coil drops to zero during the phase of the switching cycle when the transistor 105 is turned off. For higher output current draws, transformer 107 operates in continuous mode, in which the current through the secondary coil of transformer 107 will not decline to zero before transistor 105 is turned on, at which point the current through the secondary coil drops to substantially zero.

Switching regulator 103 uses path 106a to sense the current through the primary coil of transformer 107 and transistor 105 by measuring the voltage across current-sense resistor 106. Switching regulator 103 can use the timing of fluctuations in the sensed current to determine the timing of the pulses for the generation of the PWM waveform. The actual values of the measured current are not used by switching regulator 103. Switching regulator 103 may also use other means to generate the PWM waveform. Switching regulator 103 may be controlled by PSE controller 104, which can receive information regarding power usage by the PD from line-side PSE controller 110, via optical isolator 108. Alternatively, switching regulator 103 can be set to provide a predefined switching signal, whereupon line-side PSE controller 110 can regulate the actual electrical power provided to the PD. PSE controller 104 communicates with a host controller (not shown) via path 104a.

Line-side PSE controller 110 performs several PoE-related functions, including detection, optional classification, and fault monitoring. Detection comprises detecting whether a PoE-compliant PD has been connected to PSE port 100 by measuring currents and/or voltages. Classification comprises attempting to determine the expected power usage of the PD. After the detection of a valid PD, power is provided to the PD. Fault monitoring, which is used while power is being provided by PSE port 100 to the PD, comprises monitoring the level of current drawn by the PD to determine whether the PD has been disconnected, experienced a short-circuit, or started drawing too much power. Monitoring for PD disconnection is also known as maintain power signature (MPS) monitoring. If MPS is present (i.e., monitoring indicates that a power signature is being maintained), then the PD is considered connected.

Normally, if a PD is connected to PSE port 100, then PSE port 100 provides a variable electrical current, within a specified range, at a regulated voltage of 48V. If the level of the current drawn by the PD falls below $I_{MIN}$, a specified minimum threshold, for at least a specified interval, then it is determined that the PD has been disconnected, and PSE port 100 cuts off the provision of electrical power to the PD. The present standard specifies that, at electrical current levels of less than 5 mA, MPS is absent, while, at electrical current levels of more than 10 mA, MPS is present. For electrical current levels between 5 mA and 10 mA, the determination regarding the presence of MPS is dependent on the particular implementation. The present standard further specifies that the PD may not be disconnected if MPS is absent for less than 300 mS, and must be disconnected if MPS is absent for more than 400 mS. Action for MPS absences of between 300 and 400 mS is implementation-dependent. Following the cut-off of power, i.e., disconnection, PSE port 100 returns to detection mode, to determine whether a valid PD has been connected.

PSE port 100 also monitors the electrical-current usage of the PD for other fault conditions to prevent power overloads and excessive current draws. Current draw may never exceed a maximum current $I_{LIM}$, set in the present standard at between 400 and 450 mA. A current draw greater than $I_{LIM}$ is treated as a short circuit and causes a cut-off of electrical power. To prevent power overloads, the present standard requires disconnecting the PD if current draw exceeds a threshold value $I_{CUT}$, for more than a threshold time period $T_{CUT}$. The present standard specifies an $I_{CUT}$ of 350-400 mA, and a $T_{CUT}$ of 50-75 mS. The present standard further specifies that, if current draw exceeds $I_{CUT}$ for $T_{CUT}$, then power will be disconnected to the PD for a "penalty" period of 3-5 seconds.

Line-side PSE controller 110 can communicate with PSE controller 104 through optical isolator 108. Optical isolator 108 comprises a light-emitting diode (LED) and a phototransistor or photodiode for electrically-isolated transmission of information from the line side to the isolated side.

SUMMARY OF THE INVENTION

In one embodiment, the invention is a method for monitoring a line-side electrical current provided by a power sourcing equipment (PSE) port to a powered device (PD), the PSE port having a power-isolation transformer with a line side and an isolated side, the method comprising: (a) determining a value for an electrical current on the isolated side of the power-isolation transformer, and (b) indirectly monitoring the line-side electrical current based on the determined isolated-side electrical current value.

In another embodiment, the invention is a power sourcing equipment (PSE) port adapted to provide a line-side electrical current to a powered device (PD), the PSE port comprising a power-isolation transformer with a line side and an isolated side, and an isolated-side controller connected to the isolated side of the power-isolation transformer. The isolated-side controller is adapted to: (a) determine a value for an electrical current on the isolated side of the power-isolation transformer, and (b) indirectly monitor the line-side electrical current based on the determined isolated-side electrical current value.

In yet another embodiment, the invention is an apparatus for providing a line-side electrical current to a powered device (PD), the apparatus comprising: (a) means for providing power isolation, having a line side and an isolated side, (b) means for determining a value for an electrical current on the isolated side of the power-isolation means, and (c) means for indirectly monitoring the line-side electrical current based on the determined isolated-side electrical current value.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Moving the components performing the functionality of the line-side PSE controller to the isolated side may help reduce the cost of a PSE device by reducing the number of individual components needed since the move would allow the line-side PSE controller to be integrated with the PSE controller of the isolated side on a single integrated circuit, and would allow the optical isolator to be altogether eliminated. Such integration is not, however, obligatory.

Figure 2:
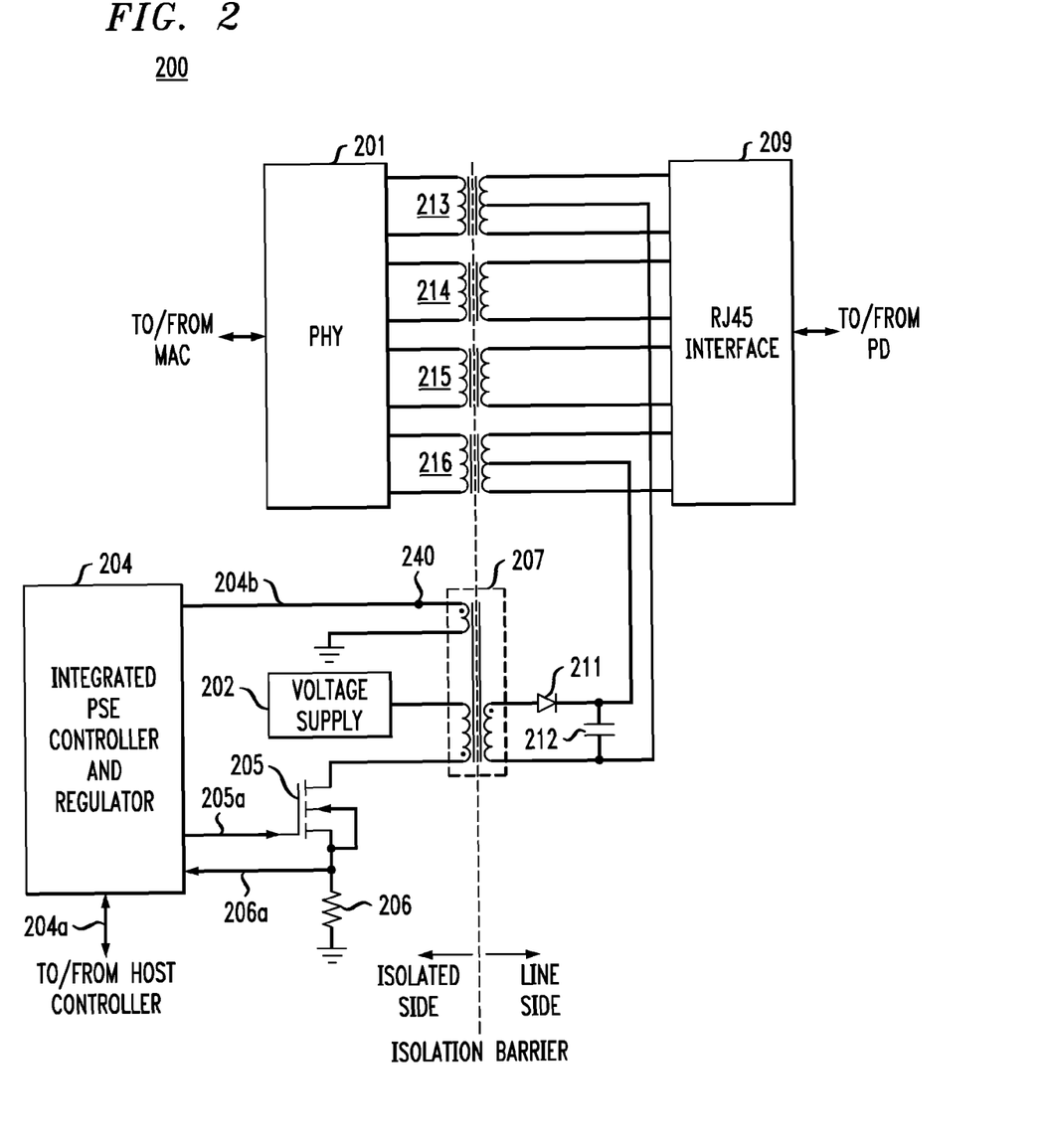
FIG. 2 shows a simplified block diagram of a PSE port according to one embodiment of the present invention.

FIG. 2 shows a simplified block diagram of PSE port 200 according to one embodiment of the present invention. Elements in FIG. 2 that are similar to elements in FIG. 1 are similarly labeled, but with a different prefix. The line side of PSE port 200 comprises RJ45 interface 209, diode 211, and capacitor 212. The isolated side of PSE port 200 comprises PHY 201, voltage supply 202, transistor 205, resistor 206, and integrated PSE controller and regulator 204. Supporting the isolation barrier, and having components on both the isolated side and the line side of PSE port 200, are signal-isolation transformers 213, 214, 215, and 216, and power transformer 207.

Integrated PSE controller and regulator 204 combines the functions previously performed by a PSE switching regulator, a PSE controller, and a line-side PSE controller, such as FIG. 1's PSE switching regulator 103, PSE controller 104, and line-side PSE controller 110.

Power transformer 207 comprises three coils: (i) a primary coil connected between voltage supply 202 and transistor 205, (ii) a secondary coil connected to diode 211 and capacitor 212, and (iii) an auxiliary coil connected between integrated PSE controller and regulator 204 and a reference node (e.g., ground). Although FIG. 2 shows the secondary coil outputs connected to a particular pair of signal-isolation transformers, the secondary coil may be connected to any appropriate pair of signal-isolation devices. The voltage across the auxiliary coil of power transformer 207, which can be measured at voltage-sensing node 240, depends on the voltages across the primary coil and/or the secondary coil, as well as the ratios of turns between the auxiliary coil and the primary and secondary coils.

Integrated PSE controller and regulator 204 measures the voltage across the auxiliary coil of transformer 207, using path 204b, when the voltage across the auxiliary coil is proportional to the voltage across the secondary coil, i.e., when transistor 205 is off. Integrated PSE controller and regulator 204 uses the measure as feedback in regulating the voltage provided to the PD by PSE port 200. Integrated PSE controller and regulator 204 measures the current going through the primary coil of transformer 207 by measuring the voltage across current-sense resistor 206, using path 206a. In typical operation, the peak current through the primary coil of transformer 207 is related to the average output current provided to the PD. Thus integrated PSE controller and regulator 204 may be able to determine and control the average output current provided to the PD.

While some functionality has migrated to the isolated side in PSE port 200 as compared to PSE port 100 of FIG. 1, power conditioning has not migrated and continues to be performed on the line side of PSE port 200. Diode 211 and capacitor 212 represent a simple power conditioning circuit; however, power conditioning can be provided by components other than or in addition to diode 211 and capacitor 212.

Figure 3:
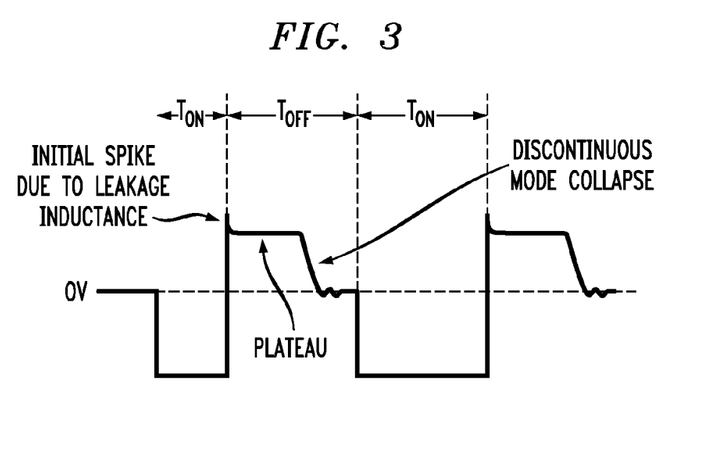
FIG. 3 shows a sample voltage trace for the voltage across the auxiliary coil of transformer 207 of FIG. 2 during discontinuous mode operation of integrated PSE controller and regulator 204 of FIG. 2.

FIG. 3 shows a sample voltage trace for the voltage across the auxiliary coil of transformer 207 of FIG. 2 during discontinuous mode operation by integrated PSE controller and regulator 204. If transistor 205 is on, designated as a $T_{ON}$ interval, and current is flowing through the primary coil of transformer 207, then the voltage across the auxiliary coil is a substantially constant negative value in proportion to the voltage across the primary coil, wherein the proportion is dependent on the turns ratio between the auxiliary and the primary coils. When transistor 205 is turned off, designated as a $T_{OFF}$ interval, then the voltage across the auxiliary coil of transformer 207 reflects the voltage across the secondary coil of transformer 207. The voltage across the auxiliary coil first spikes to a positive voltage value, then drops to a positive plateau proportional to the voltage across the secondary coil of transformer 207, with the proportionality subject to an offset to account for nearby components. The plateau holds while the electromagnetic energy stored in the secondary coil is transferred to the PD. The plateau is then followed by a discontinuous mode collapse, characterized by a rapid decline to zero volts accompanied by some oscillation, as the electromagnetic energy stored in the secondary coil dissipates.

At the start of the next cycle, when transistor 205 is turned on and current again flows through the primary coil of transformer 207, the cycle repeats with the voltage across the auxiliary coil dropping to a substantially constant negative value. If integrated PSE controller and regulator 204 were operating in continuous mode, then the plateau during the $T_{OFF}$ interval would continue until the $T_{ON}$ interval, thus making the voltage trace appear more like a square wave. The references herein to negative and positive voltages are relative and are for illustration purposes; the polarities may be reversed without departing from the teachings of the invention, as would be appreciated by one of ordinary skill in the art.

Figure 4A:
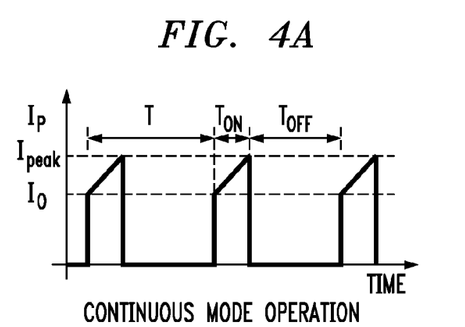
FIGS. 4A-4D show sample current traces for the currents through the primary and secondary coils of transformer 207 of FIG. 2 in continuous and discontinuous operation.
Figure 4B:
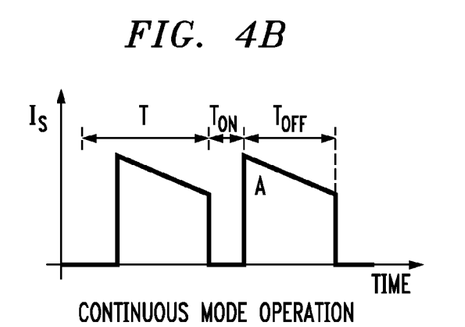

FIGS. 4A-4D show sample current traces for the currents through the primary and secondary coils of transformer 207 of FIG. 2 in continuous and discontinuous operation. FIGS. 4A-4B show sample current traces for continuous operation, with $I_P$, the current through the primary coil of transformer 207, in FIG. 4A, and $I_S$, the current through the secondary coil of transformer 207, in FIG. 4B. At the start of the $T_{ON}$ interval, i.e., when transistor 205 is turned on, $I_P$ starts at an initial current level $I_0$, and rises steadily, reaching a peak value $I_{peak}$, just as transistor 205 is turned off, at the start of a $T_{OFF}$ interval. The initial current level $I_0$, depends on the output current required for provision to the PD, the duty cycle, the switching frequency, the input supply voltage, and power transformer characteristics. The rate of increase in $I_P$ during a $T_{ON}$ interval is dependent on the voltage across, and inductance of, the primary coil. During the $T_{OFF}$ interval, substantially no current flows through the primary coil of transformer 207. During the $T_{ON}$ interval, substantially no current flows through the secondary coil of transformer 207. At the start of the $T_{OFF}$ interval, $I_S$ starts at an initial current level and declines steadily until the time transistor 205 is turned on, when current $I_S$ drops to zero for the $T_{ON}$ interval. At the start of the next $T_{OFF}$ interval, the cycle repeats. Together, one $T_{ON}$ interval and one $T_{OFF}$ interval make one cycle, or one T interval.

Figure 4C:
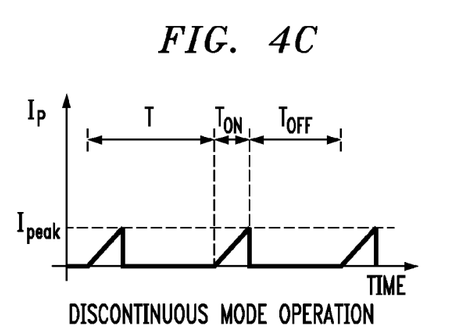
Figure 4D:
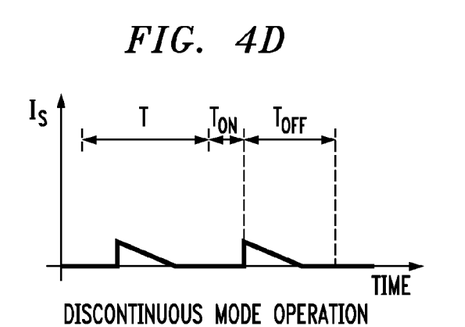

FIGS. 4C-4D show sample current traces for discontinuous operation, with $I_P$, the current through the primary coil of transformer 207, in FIG. 4C, and $I_S$, the current through the secondary coil of transformer 207, in FIG. 4D. During a $T_{OFF}$ interval, substantially no current flows through the primary coil. At the start of a $T_{ON}$ interval, $I_P$ starts at a current level of zero and rises steadily, reaching a peak value $I_{peak}$, just as transistor 205 is turned off, at the start of a $T_{OFF}$ interval. The rate of increase in $I_P$ during a $T_{ON}$ interval is dependent on the voltage across, and the inductance of, the primary coil. During the $T_{ON}$ interval, substantially no current flows through the secondary coil of transformer 207. At the start of the $T_{OFF}$ interval, $I_S$ starts at an initial current level and declines steadily until reaching zero, where $I_S$ remains for the remaining duration of the $T_{OFF}$ interval and for the $T_{ON}$ interval. At the start of the next $T_{OFF}$ interval, the cycle repeats.

The fault-monitoring conditions discussed above, e.g., MPS signature absence (i.e., disconnection), short-circuit, and power overload, are detected, or triggered, at defined values of $I_{out}$, the average output current. Since the quantity that can be measured on the isolated side by integrated PSE controller and regulator 204 is $I_{peak}$, it would help to know how $I_{peak}$ varies in relation to $I_{out}$, and in particular, what are the corresponding $I_{peak}$ values for the $I_{out}$ trigger values. Alternatively, it is possible to continuously calculate the present value of $I_{out}$ based on the present value of $I_{peak}$.

The steady-state relationship between $I_{peak}$ and $I_{out}$ in continuous mode operation can be derived from several, more basic relationships. In continuous mode, the average output current $I_{out}$ provided to the PD, is represented by the following equation:

$$I_{out} = \frac{I_{LP}}{n}(1-D) \tag{1}$$

wherein $I_{Lp}$ is the average primary-coil current during the interval that the transistor 205 is on, n is the secondary-to-primary turns ratio, and D is the duty cycle. The average secondary coil current is $I_{Lp}/n$ during the interval that transistor 205 is off.

In continuous mode, the relationship between the input voltage $V_{in}$ and the current through the primary coil of transformer 207 is represented by the following equation:

$$V_{in} = L_p \frac{I_{peak} - I_0}{D \cdot T} \tag{2}$$

wherein $L_p$ is the inductance of the primary coil and T is the switching period (i.e., the inverse of the switching frequency).

In continuous mode, during the interval that transistor 205 is on, the average primary coil current is represented by the following equation, which represents an average for a trapezoidal waveform:

$$I_{Lp} = \frac{I_0 + I_{peak}}{2} \tag{3}$$

Solving Equations 1-3 for $I_{peak}$ results in the following equation:

$$I_{peak} = \frac{1}{2}\frac{V_{in} \cdot T}{L_p}D + \frac{n \cdot I_{out}}{1-D} \tag{4}$$

In PSE port 200 of FIG. 2, the duty cycle might not be a quantity that is directly measured. However, the steady-state duty cycle is related to $V_{in}$ and the output steady-state voltage $V_{out}$, as per the following equation:

$$\frac{V_{out}}{n \cdot V_{in}} = \frac{D}{1-D} \tag{5}$$

which allows for the replacement of D in Equation 4, resulting in the equation below:

$$I_{peak} = \frac{1}{2}\frac{V_{in} \cdot T}{L_p}\frac{1}{1+n \cdot \frac{V_{in}}{V_{out}}} + n \cdot I_{out}\frac{1+n \cdot \frac{V_{in}}{V_{out}}}{n \cdot \frac{V_{in}}{V_{out}}} \tag{6}$$

So once the regulated output voltage $V_{out}$, the input voltage $V_{in}$, the secondary-to-primary turns ratio n, the switching period T, and the primary coil inductance $L_P$ are fixed, then $I_{peak}$ is a simple affine and increasing function of the steady-state DC output current $I_{out}$.

If transformer 207 operates in discontinuous mode, then the current on the secondary coil side drops to zero before the end of each $T_{OFF}$ interval, and the primary side current starts from zero at the beginning of each $T_{ON}$ interval. This also means that the magnetic energy transferred to the secondary coil each time transistor 205 goes from on to off is substantially completely transferred to the PD during the $T_{OFF}$ interval. There is substantially no magnetic energy transferred back to the primary coil when transistor 205 goes from off to on. This means that, in discontinuous mode, the energy stored in the primary coil at the end of each $T_{ON}$ interval is equal to the energy consumed by the load on the secondary side. This translates into the equation below:

$$\frac{1}{2}L_P I_{peak}^2 \frac{1}{T} = V_{out} \cdot I_{out} \tag{7}$$

The boundary between continuous-mode and discontinuous-mode operation, represented as $I^*_{out}$, can be found using the following equations:

$$I^*_{out} = \frac{1}{2}\frac{V_{in} \cdot T}{L_P}\frac{D \cdot (1-D)}{n} \tag{8}$$

$$= \frac{1}{2n}\frac{V_{in} \cdot T}{L_P}\frac{n \cdot \frac{V_{in}}{V_{out}}}{\left(1+n \cdot \frac{V_{in}}{V_{out}}\right)^2}$$

Figure 5:
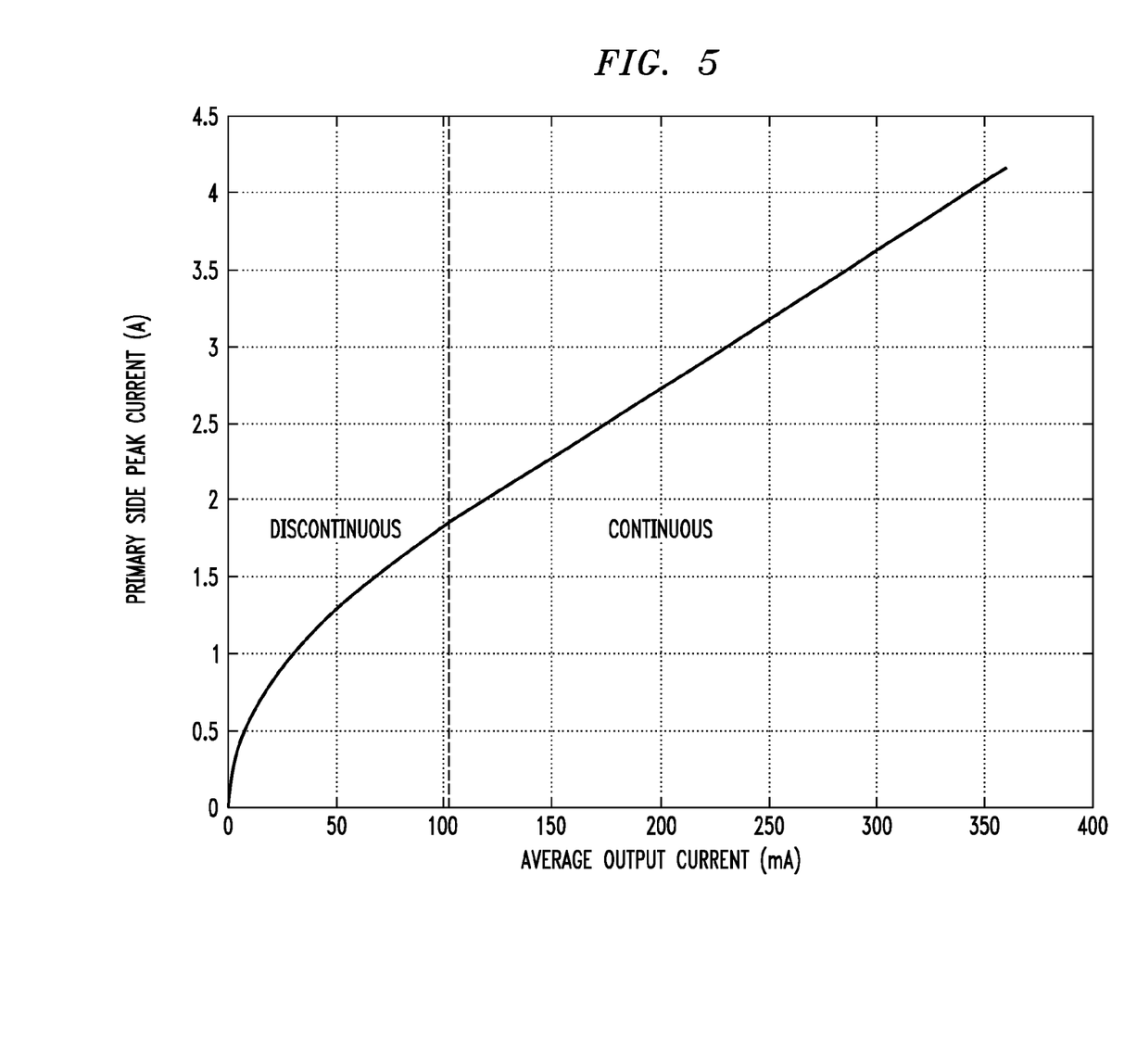
FIG. 5 shows $I_{peak}$ as a function of $I_{out}$ for particular sample values of components of PSE port 200 of FIG. 2.

FIG. 5 shows $I_{peak}$ as a function of $I_{out}$ for the following sample values: n=5, $V_{in}$=12V, $V_{out}$=48V, T=2 μS, $L_P$=5.76 μH. Using the above sample values results in a boundary value of $I^*_{out}$=103 mA, Using Equation 6 results in a corresponding peak current value of $I^*_{peak}$=1.85 A. Using the above sample values and sample fault triggering current values of $I_{MIN}$=7.5 mA, $I_{CUT}$=375 mA, and $I_{LIM}$=425 mA results in $I_{peak}$ values of 0.50 A, 3.53 A, and 3.76 A, respectively. Thus, integrated PSE controller and regulator 204 can monitor for the latter current values via path 206a from current-sense resistor 206.

Figure 6:
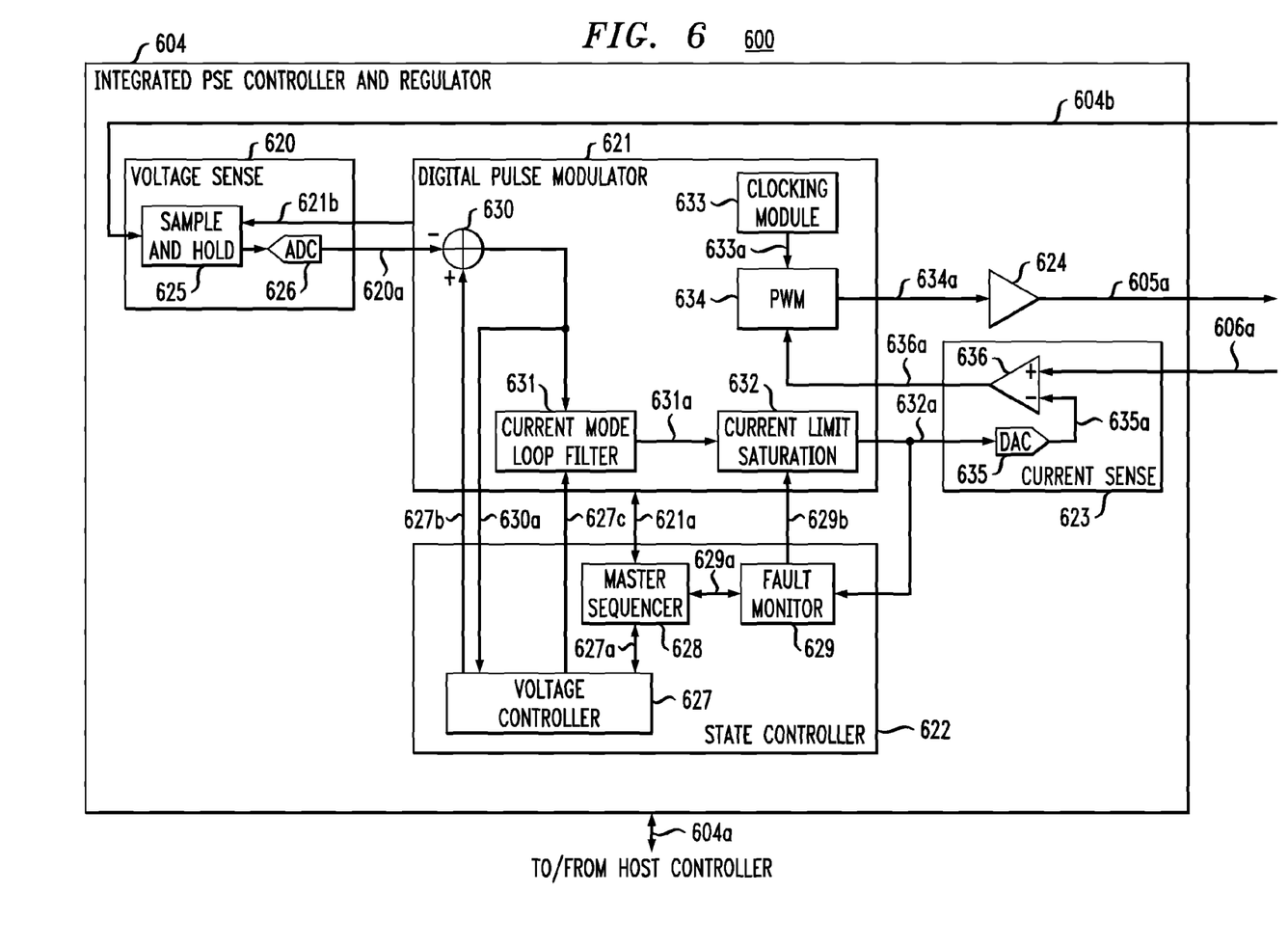
FIG. 6 shows a PSE port in accordance with another implementation of the present invention.

FIG. 6 shows PSE port 600 in accordance with another embodiment of the present invention. Elements in FIG. 6 that are similar to corresponding elements of FIG. 2 are similarly labeled, but with a different prefix. PSE port 600 comprises (i) RJ45 interface 609, diode 611, and capacitor 612 on the line side; (ii) PHY 601, integrated PSE controller and regulator 604, transistor 605, voltage supply 602, current-sense resistor 606, resistors R1 and R2, and diode 617 on the isolated side; and (iii) transformers 613, 614, 615, 616, and 607 on both the line and isolated sides, supporting the isolation barrier.

Diode 617 prevents the flow of current through the auxiliary coil of power transformer 607 if transistor 605 is on, i.e., during the $T_{ON}$ intervals when current is flowing through the primary coil of transformer 607. As noted above, during the $T_{ON}$ interval, the voltage across the auxiliary coil, which can be measured at voltage-sensing node 640, is substantially proportional to the voltage across the primary coil and the voltage across the secondary coil. Because of the arbitrary voltage drop across the reverse-biased diode 611, information about the output voltage of interest is not directly provided by the auxiliary coil during the $T_{ON}$ interval. Thus, using diode 617 reduces the overall electrical power consumed by PSE port 600 without materially degrading the ability of integrated PSE controller and regulator 604 to monitor the voltage on the line side. Diode 617 is also useful to help avoid negative voltages getting provided to integrated PSE controller and regulator 604.

Resistors R1 and R2 form a voltage divider for the voltage across the auxiliary coil of transformer 607. The output of the voltage divider is voltage feedback path 604b. By scaling down the voltage across the auxiliary coil of transformer 607, the voltage divider allows integrated PSE controller and regulator 604 to measure voltages higher than it might normally be able to handle. Sample values for R1 and R2 are 15 kΩ and 5 kΩ, respectively, which would scale down the voltage across the auxiliary coil of transformer 607 by a factor of 4. Appropriate scaling of the voltage sensed by integrated PSE controller and regulator 604 is performed to account for the resistor ratios of the voltage divider.

Integrated PSE controller and regulator 604 comprises voltage-sensing module 620, digital pulse modulator 621, current-sense module 623, state controller 622, MOSFET driver 624, as well as additional components (not shown) as appropriate for its functions. Voltage-sensing module 620 senses the voltage at voltage-sensing node 640 via path 604b, the voltage divider comprising resistors R1 and R2, and diode 617. Voltage-sensing module 620 comprises sampler 625 and ADC 626. Sampler 625 samples the voltage on path 604b, as triggered by digital pulse modulator 621 via path 621b, and holds the sampled voltage value. The triggering period is typically equal to the switching period of the switching signal driving transistor 605, but at an offset, i.e., phase shifted so that a meaningful plateau value, such as that shown in FIG. 3, is sampled during each cycle. Sampler 625 provides the held sampled voltage value to ADC 626 which converts the analog voltage value into a digital value for sign inversion (e.g., positive to negative) and provision to digital pulse modulator 621 via path 620a. Digital pulse modulator 621 comprises clocking module 633, pulse-width modulator (PWM) 634, adder 630, current-mode loop filter 631, and current-limit saturation module 632.

State controller 622 controls the voltage regulation and current-sensing functions of integrated PSE controller and regulator 604. State controller 622 comprises voltage controller 627, master sequencer 628, and fault monitor 629. Master sequencer 628 provides control signals to voltage controller 627, fault monitor 629, and digital pulse modulator 621 via paths 627a, 629a, and 621a, respectively. Fault monitor 629 stores, provides, and monitors scaled values of electrical-current thresholds such as $I_{LIM}$, $I_{CUT}$, and $I_{MIN}$. Master sequencer 628 provides, via path 621a, high-level control signals, such as set, reset, and disable, to digital pulse modulator 621.

Voltage controller 627 provides to digital pulse modulator 621, via path 627b, in appropriate digital format, the desired voltage value, scaled to account for the turns ratio in transformer 607, voltage dividers, and any additional appropriate scaling factors. The desired output voltage value is determined by master sequencer 628 and provided to voltage controller 627 via path 627a. Inside digital pulse modulator 621, adder 630 sums the digital voltage values from paths 620a and 627b to output a voltage error value via path 630a, which is provided to voltage controller 627 and current-mode loop filter 631.

Voltage controller 627 uses the error value received via path 630a to determine whether the feedback loop is locked, i.e., whether the error is sufficiently close to zero to indicate that the voltage being provided to the PD is steady and substantially equal to the desired voltage value. In a typical implementation of this embodiment, loop locking takes several hundred clock cycles, equivalent to a millisecond or two where the clock period is in the single-digit microseconds range. If voltage controller 627 determines that the loop is locked, then voltage controller 627 notifies master sequencer 628 via path 627a. This can be used as a trigger by master sequencer 628, for example, to commence the timing of the provision of a particular voltage, where a particular voltage needs to be provided for a predetermined length of time.

Current-mode loop filter 631 uses the error value received via path 630a to modify the desired peak-current value provided to current-limit saturation module 632. It should be noted that the term "peak-current value" is used herein for convenience of reference, as the actual value may be a voltage value obtained by using the resistance of current-sense resistor 606. If the error is positive, then the voltage provided to the PD is lower than the desired voltage and needs to be raised, so current-mode loop filter 631 increases the desired peak-current value provided via path 631a, which, as explained below, will increase the electric power provided to the PD. If the error is negative, then the voltage provided to the PD is higher than the desired voltage and needs to be lowered, so current-mode loop filter 631 reduces the desired peak-current value provided via path 631a, which, as explained below, will reduce the electric power provided to the PD.

Current-limit saturation module 632 maintains the peak-current value provided by current-mode loop filter 631 within an allowed range of values. If the received peak-current value is negative, then current-limit saturation module 632 outputs a peak-current value of zero. If the received peak-current value is higher than a maximum threshold, then current-limit saturation module 632 outputs a peak-current value equivalent to the maximum threshold. The maximum threshold value is a scaled value proportional to $I_{LIM}$, the maximum current value that can be provided by PSE port 600 to the PD. The maximum threshold value is provided to current-limit saturation module 632 by fault monitor 629 via path 629b. Current-limit saturation module 632 outputs, via path 632a, the peak-current value it receives from current-mode loop filter 631, as limited, if necessary, to zero or the maximum threshold.

The peak-current value output by current-limit saturation module 632 is provided to current-sense module 623 via path 632a. Current-sense module 623 comprises DAC 635 and comparator 636. DAC 635 receives the peak-current value and converts it into an analog value, which is in turn provided to the negative input of comparator 636 via path 635a. If the peak-current value is in amperes, then DAC 635, or anther appropriate device (not shown), can convert the digital peak-current value into a corresponding voltage value using the resistance of current-sense resistor 606, or other appropriate method. The positive input of comparator 636 receives, via path 606a, the voltages across current-sense resistor 606, which is indicative of the current through transistor 605. If the value on path 606a is higher than the value on path 635a, then the output of comparator 636 is high. If the value on path 606a is lower than the value on path 635a, then the output of comparator 636 is low. When transistor 605 is turned on, the current flowing through transistor 605 rises substantially linearly. In typical operation, at the start of a $T_{ON}$ interval of a switching cycle, (i) the current through transistor 605 is between zero and the peak-current value, and (ii) the output of comparator 636 is low. In typical operation, during a $T_{ON}$ interval, the current through transistor 605 rises linearly to the peak-current value before the end of the $T_{ON}$ interval. If the current through transistor 605 reaches the peak-current value, then the output of comparator 636 goes to high.

The output of comparator 636 is provided, via path 636a, to PWM 634, which is in digital pulse modulator 621. PWM 634 generates the switching signal that drives transistor 605, based on the inputs from paths 636a and 633a. The signal on path 633a is provided by clocking modulator 633, which provides the switching frequency for the switching signal that drives transistor 605. PWM 634 generates a switching signal that (i) goes high at the start of the switching period, which is indicated by clocking module 633 via path 633a, and (ii) stays high as long as the output of comparator 636 is low, which is indicated via signal path 636a. If the signal on path 636a goes high, then the switching signal output by PWM 634 goes low. PWM 634 outputs the switching signal via path 634a. The switching signal on path 634a is amplified by MOSFET driver 624, which in turn drives transistor 605 with the switching signal via path 605a. Thus, generally, a sudden increase in the peak-current value to compensate for an output voltage drop, results in a longer time interval when the switching signal is high, i.e., a higher duty cycle of the switching signal, and more electrical power is provided to the PD during this transient which can last for a few switching cycles before a new steady-state is reached.

If the feedback loop of FIG. 6 described above is locked, then the peak-current value is related to the average output current in the manner described above, relating $I_{peak}$ to $I_{out}$. Once the loop is locked, fault monitor 629 monitors the peak-current value via path 632a. If the peak-current value crosses any of the appropriately-scaled threshold values that fault monitor 629 monitors, such as $I_{LIM}$, $I_{CUT}$, and $I_{MIN}$, then fault monitor 629 alerts master sequencer 628, via path 629a, so that appropriate responsive action may be taken. For example, if the peak-current value falls below the scaled value of $I_{MIN}$, then fault monitor 629 alerts master sequencer 628. Master sequencer 628 then starts an MPS fault timer. If the peak-current value does not rise above the scaled value of $I_{MIN}$ within the allowable time (300-400 mS, as discussed above), then master sequencer 628 concludes that the PD has been disconnected, ceases the provision of electrical power to the PD, and directs PSE port 600 to enter detection mode, as discussed above.

The embodiment represented in FIG. 6 is exemplary. As would be appreciated by one of ordinary skill in the art, numerous variations, such as alternative power-conversion topologies, polarity inversions, path reroutes, and value scalings, are possible that would not depart from the scope of the present invention. For example, instead of employing an auxiliary coil, the primary coil of power transformer 607 can be used, with appropriate wiring and additional components, to sense the voltage across the secondary coil when transistor 605 is off.

The embodiments of the invention described herein provide electrical power to the PD using a so-called flyback converter. As would be appreciate by a person of ordinary skill in the art, other power converters, e.g., Cuk, or forward, can be used instead, with appropriate modifications, as would be understood by the person of ordinary skill in the art.

Although the present invention has been described in the context of communication systems conforming to the IEEE 802.3 Ethernet and IEEE 802.3af PoE standards, the invention is not necessarily limited to communication systems that conform to either or both of those two standards. Moreover, as those standards may evolve over time, it is expected that implementations of the present invention can also evolve in a corresponding manner.

Although the present invention is described in the context of switches in which a 48-volt (differential) DC signal is applied to the secondary-side coils of two signal-isolation transformers, the invention is not necessarily so limited. For example, the present invention may be implemented in the context of (1) DC power signals having voltage levels other than 48 volts, (2) non-differential (i.e., single-sided) DC power signals, and (3) even differential or single-sided AC power signals. Moreover, the power signals may be provided to the cables via other means, such as direct connection to the connector. Furthermore, the present invention may be implemented in contexts other than switches, such as routers or other suitable apparatus.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims are recited in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Unless explicitly stated otherwise, each numerical value and range should be interpreted as being approximate as if the word "about" or "approximately" preceded the value of the value or range. As used in this application, unless otherwise explicitly indicated, the term "connected" is intended to cover both direct and indirect connections between elements. The terms "connect," "connected," or "connection" as used herein refer to a linking that allows the transmission of electromagnetic signals. The transmission (1) may be through one or more media, (2) may be either unidirectional or bidirectional, and (3) may be direct or indirect, in which case the linking includes one or more intermediary devices. For example, transmission may take place via electrically conductive elements, radio-frequency (RF) wireless signals, infra-red (IR) wireless signals, optical fibers, capacitive coupling, magnetic coupling, or any other suitable means of signal transmission.

Unless indicated otherwise, the term "determine" and its variants as used herein refer to obtaining a value through measurement and, if necessary, transformation. For example, to determine an electrical-current value, one may measure a voltage across a current-sense resistor, and then multiply the measured voltage by an appropriate value to obtain the electrical-current value. If the voltage passes through a voltage divider or other voltage-modifying components, then appropriate transformations can be made to the measured voltage to account for the voltage modifications of such components and to obtain the corresponding electrical-current value.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

We claim:

1. A method for monitoring a line-side electrical current provided by a power sourcing equipment (PSE) port to a powered device (PD), the PSE port having a power-isolation transformer comprising a primary coil on an isolated side and a secondary coil on a line side, the method comprising:
   (a) determining a value for an electrical current on the isolated side of the power-isolation transformer;
   (b) indirectly monitoring the line-side electrical current based on the determined isolated-side electrical current value;
   (c) sampling the voltage at a voltage-sensing node on the isolated side and holding a resulting analog sampled voltage value;
   (d) generating an isolated-side-current-based voltage value based on the electrical current through the primary coil; and
   (e) converting the analog sampled voltage value into a digital sampled voltage value and using the digital sampled voltage value and the isolated-side-current-based voltage value to control a switching signal, wherein:
   the primary coil is connected between a voltage source having a first voltage value and a transistor, wherein the transistor: (i) is connected to a reference node, and (ii) is adapted to be driven by the switching signal having a switching period and a duty cycle; and
   the secondary coil is connected to the PD.

2. The method of claim 1, wherein step (b) comprises converting the determined isolated-side electrical current value into a corresponding line-side electrical current value.

3. The method of claim 2, wherein step (b) further comprises comparing the corresponding line-side electrical current value to one or more non-zero line-side electrical current thresholds.

4. The method of claim 2, wherein:
   the determined isolated-side electrical current value is a determined isolated-side peak-current value; and
   the corresponding line-side electrical current value is an average line-side electrical current value.

5. The method of claim 4, wherein the average line-side electrical current value is determined based on (i) the determined isolated-side peak-current value, (ii) a period of a switching signal applied to the isolated side of the power-isolation transformer, and (iii) one or more parameters of the power-isolation transformer.

6. The method of claim 1, wherein step (b) comprises comparing the determined isolated-side electrical current value to one or more isolated-side non-zero electrical current thresholds, wherein each isolated-side electrical current threshold corresponds to a selected line-side electrical current threshold.

7. The method of claim 6, wherein step (b) further comprises converting each selected line-side electrical current threshold to a corresponding isolated-side electrical current threshold.

8. The method of claim 6, wherein:
   the determined isolated-side electrical current value is a determined isolated-side peak-current value; and
   each isolated-side current electrical threshold is based on (i) a corresponding line-side electrical current value, (ii) a period of a switching signal applied to the isolated side of the power-isolation transformer, and (iii) one or more parameters of the power-isolation transformer.

9. The method of claim 6, wherein step (b) comprises comparing the determined isolated-side electrical current value to at least two different isolated-side electrical current thresholds.

10. The method of claim 1, wherein:
    the line-side electrical current has a line-side electrical current value $I_{out}$;
    the determined isolated-side electrical current value is a determined isolated-side peak-current value $I_{peak}$; and
    step (b) comprises converting between $I_{out}$ and $I_{peak}$.

11. The method of claim 10, wherein:
    the power-isolation transformer is operating in a continuous mode; and
    the relationship between $I_{peak}$ and $I_{out}$ is substantially represented by the equation:

$$I_{peak} = \frac{1}{2} \frac{V_{in} \cdot T}{L_p} D + \frac{n \cdot I_{out}}{1 - D}$$

wherein T is the switching period, $L_p$ is inductance of the primary coil, n is a ratio of turns between the secondary and primary coils, and D is the duty cycle.

12. The method of claim 11, wherein:
    the power-isolation transformer: (i) has an input voltage across the primary coil of $V_{in}$ and (ii) provides a steady-state voltage value of $V_{out}$ to the PD; and
    the relationship between $I_{peak}$ and $I_{out}$ is substantially represented by the equation:

$$I_{peak} = \frac{1}{2} \frac{V_{in} \cdot T}{L_p} \frac{1}{1 + n \cdot \frac{V_{in}}{V_{out}}} + n \cdot I_{out} \frac{1 + n \cdot \frac{V_{in}}{V_{out}}}{n \cdot \frac{V_{in}}{V_{out}}}.$$

13. The method of claim 10, wherein:
    the power-isolation transformer (i) is operating in a discontinuous mode, and (ii) provides a steady-state voltage value of $V_{out}$ to the PD; and the relationship between $I_{peak}$ and $I_{out}$ is substantially represented by the equation:

$$\frac{1}{2}L_P I_{peak}^2 \frac{1}{T} = V_{out} \cdot I_{out}$$

wherein T is the switching period, and $L_p$ is inductance of the primary coil.

14. The method of claim 1, wherein the determined isolated-side electrical current value is a determined isolated-side peak-current value, the method further comprising:
setting a line-side threshold for the line-side electrical current;
generating a corresponding isolated-side peak-current threshold based on the line-side threshold, the switching period, the duty cycle, and one or more properties of the power-isolation transformer; and
comparing the determined isolated-side peak-current value to the isolated-side peak-current threshold.

15. The method claim 14, wherein the isolated-side peak-current threshold corresponds to a minimum line-side electrical current threshold, the method further comprising:
ceasing providing the line-side electrical current to the PD if the determined isolated-side peak-current value remains below the isolated-side peak-current threshold for at least a minimum-current time-constant interval.

16. The method of claim 14, wherein the isolated-side peak-current threshold corresponds to a current-overload line-side electrical current threshold, the method further comprising:
ceasing providing the line-side electrical current to the PD if the determined isolated-side peak-current value remains above the isolated-side peak-current threshold for at least a current-overload time-constant interval.

17. The method of claim 14, wherein the isolated-side peak-current threshold corresponds to a current-limit line-side electrical current threshold, the method further comprising:
ceasing providing the line-side electrical current to the PD if the determined isolated-side peak-current value is above the isolated-side peak-current threshold.

18. The method of claim 1, wherein the power-isolation transformer comprises an auxiliary coil connected to the voltage-sensing node.

19. The method of claim 1, wherein step (e) comprises:
generating a voltage-error value based on the sampled voltage value and a desired voltage value;
adjusting a generated current-based voltage value based on the voltage-error value;
comparing the generated current-based voltage value to the isolated-side-current-based voltage value; and
controlling the switching signal based on the comparison.

20. The method of claim 1, wherein the sampled voltage value is obtained by sampling the voltage at the voltage-sensing node via a diode.

21. The method of claim 1, wherein the sampled voltage value is obtained by sampling the voltage at the voltage-sensing node via a voltage divider.

22. The method of claim 1, wherein the PSE port and the PD comply with an IEEE Power over Ethernet standard.

23. A power sourcing equipment (PSE) port adapted to provide a line-side electrical current to a powered device (PD), the PSE port comprising:
a power-isolation transformer with a line side and an isolated side; and
an isolated-side controller connected to the isolated side of the power-isolation transformer and adapted to:
(a) determine a value for an electrical current on the isolated side of the power-isolation transformer; and
(b) indirectly monitor the line-side electrical current based on the determined isolated-side electrical current value, wherein:
the power-isolation transformer comprises:
a primary coil on the isolated side of the power-isolation transformer, wherein the electrical current on the isolated side of the power-isolation transformer is electrical current in the primary coil; and
a secondary coil on the line side of the power-isolation transformer, the secondary coil connected to the PD;
the isolated-side controller comprises:
a voltage sensor adapted to:
sample a voltage on the isolated side corresponding to a voltage across the secondary coil; and
hold a resulting analog sampled voltage;
convert the analog sampled voltage value into a digital sensed-voltage value; and
output a sensed-voltage value corresponding to the sensed voltage;
a control subsystem adapted to determine a peak-current value based on at least the sensed-voltage value; and
a current-sense module adapted to:
sense the electrical current in the primary coil; and
output a comparison signal based on a comparison of the sensed electrical current in the primary coil and the determined peak-current value.

24. The PSE port of claim 23, wherein:
the control subsystem comprises:
a voltage controller adapted to output a desired-voltage value;
an adder adapted to output a voltage-error value based on the sensed-voltage value and the desired-voltage value;
a current-mode loop filter adapted to output the determined peak-current value based on at least the voltage-error value; and
a pulse-width modulator adapted to control the electrical current in the primary coil based on a switching period and the comparison signal output by the current-sense module.

25. The PSE port of claim 24, wherein the control subsystem further comprises:
a current-limit saturation module adapted to keep the determined peak-current value within a specified range of values; and
a fault monitor adapted to compare the determined peak-current value to at least one non-zero threshold value.

26. The method of claim 11, wherein:
the continuous mode of the power-isolation transformer has (i) a first phase of a switching cycle during which current does not flow in the primary coil and (ii) a second phase of the switching cycle immediately following the first phase and during which current does flow in the primary coil; and
during the first phase, the line-side electrical current value $I_{out}$ linearly declines, but does not reach zero, prior to initiation of the second phase.

27. The method of claim 1, wherein step (e) further comprises:
generating a digital voltage-error value by subtracting the digital sampled voltage value from a digital desired-voltage value;

adjusting a generated digital current-based voltage value based on the digital voltage-error value; and comparing the generated digital current-based voltage value to at least one digital current-based threshold.

28. The method of claim 27, wherein step (e) further comprises:

converting the generated digital current-based voltage to an analog current-based voltage;

comparing the analog current-based voltage to the isolated-side-current-based voltage value;

generating a comparator output based on the comparison, wherein the comparator output is (i) a first output if the isolated-side-current-based voltage value is less than the analog current-based voltage, and (ii) a second output if the isolated-side-current-based voltage value is greater than the analog current-based voltage;

setting the switching signal to high at the start of the switching period; and setting the switching signal to low when the comparator output changes from the first output to the second output.

29. The method of claim 28, wherein the power-isolation transformer comprises an auxiliary coil connected to the voltage-sensing node.

30. A power sourcing equipment (PSE) port adapted to provide a line-side electrical current to a powered device (PD), the PSE port comprising:

(1) a power-isolation transformer with a line side and an isolated side; and (2) an isolated-side controller connected to the isolated side of the power-isolation transformer and adapted to:

(a) determine a value for an electrical current on the isolated side of the power-isolation transformer; and (b) indirectly monitor the line-side electrical current based on the determined isolated-side electrical current value, wherein:

(1) the power-isolation transformer comprises:

(a) a primary coil on the isolated side of the power-isolation transformer, wherein the electrical current on the isolated side of the power-isolation transformer is electrical current in the primary coil; and (b) a secondary coil on the line side of the power-isolation transformer, the secondary coil connected to the PD;

(2) the isolated-side controller comprises:

(a) a voltage sensor adapted to:
(i) sense a voltage corresponding to a voltage across the secondary coil; and
(ii) output a sensed-voltage value corresponding to the sensed voltage;

(b) a control subsystem adapted to determine a peak-current value based on at least the sensed-voltage value; and (c) a current-sense module adapted to:
(i) sense the electrical current in the primary coil; and
(ii) output a comparison signal based on a comparison of the sensed electrical current in the primary coil and the determined peak-current value; and (3) the control subsystem comprises:

(a) a voltage controller adapted to output a desired-voltage value;

(b) an adder adapted to output a voltage-error value based on the sensed-voltage value and the desired-voltage value;

(c) a current-mode loop filter adapted to output the determined peak-current value based on at least the voltage-error value; and (d) a pulse-width modulator adapted to control the electrical current in the primary coil based on a switching period and the comparison signal output by the current-sense module;

(e) a current-limit saturation module adapted to keep the determined peak-current value within a specified range of values; and (f) a fault monitor adapted to compare the determined peak-current value to at least one non-zero threshold value.

* * * * *

UNITED STATES PATENT AND TRADEMARK OFFICE
CERTIFICATE OF CORRECTION

PATENT NO.         : 7,843,670 B2                                  Page 1 of 1
APPLICATION NO.    : 11/536770
DATED              : November 30, 2010
INVENTOR(S)        : Matthew Blaha et al.

It is certified that error appears in the above-identified patent and that said Letters Patent is hereby corrected as shown below:

In column 16, line 18, delete the word "and".

In column 16, lines 22-23, the phrase "output a sensed-voltage value corresponding to the sensed voltage;" should read --output the sensed-voltage value;--.

Signed and Sealed this
Twenty-second Day of February, 2011

David J. Kappos
*Director of the United States Patent and Trademark Office*